(12) United States Patent
Park et al.

(10) Patent No.: US 11,958,965 B2
(45) Date of Patent: Apr. 16, 2024

(54) THERMOPLASTIC RESIN COMPOSITION AND MOLDED PRODUCT USING SAME

(71) Applicant: LOTTE CHEMICAL CORPORATION, Seoul (KR)

(72) Inventors: Jieun Park, Uiwang-si (KR); Keehae Kwon, Uiwang-si (KR); Younghyo Kim, Uiwang-si (KR); Jungwook Kim, Uiwang-si (KR); Hyeongseob Shin, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 811 days.

(21) Appl. No.: 17/043,063

(22) PCT Filed: Apr. 1, 2019

(86) PCT No.: PCT/KR2019/003796
§ 371 (c)(1),
(2) Date: Sep. 29, 2020

(87) PCT Pub. No.: WO2019/190298
PCT Pub. Date: Oct. 3, 2019

(65) Prior Publication Data
US 2021/0024735 A1    Jan. 28, 2021

(30) Foreign Application Priority Data

Mar. 30, 2018 (KR) .................. 10-2018-0037694
Mar. 29, 2019 (KR) .................. 10-2019-0036963

(51) Int. Cl.
  *C08L 25/12* (2006.01)
  *C08L 25/16* (2006.01)
  *C08L 51/04* (2006.01)

(52) U.S. Cl.
  CPC .............. *C08L 25/12* (2013.01); *C08L 25/16* (2013.01); *C08L 51/04* (2013.01); *C08L 2205/025* (2013.01); *C08L 2205/035* (2013.01)

(58) Field of Classification Search
  CPC ...... C08L 25/12; C08L 25/16; C08L 2205/02; C08L 2205/025; C08L 51/04
  See application file for complete search history.

(56) References Cited

U.S. PATENT DOCUMENTS

| | | | |
|---|---|---|---|
| 6,528,583 B1 | 3/2003 | Chen et al. | |
| 10,640,638 B2 * | 5/2020 | An | C08J 5/18 |
| 2006/0148992 A1 | 7/2006 | Kim et al. | |
| 2010/0048798 A1 | 2/2010 | You et al. | |
| 2012/0172499 A1 | 7/2012 | Na et al. | |
| 2012/0172502 A1 * | 7/2012 | Lee | C08L 55/02 |
| | | | 524/114 |
| 2013/0172485 A1 | 7/2013 | Jin et al. | |
| 2014/0235749 A1 | 8/2014 | Kim et al. | |
| 2015/0005435 A1 | 1/2015 | Park et al. | |
| 2016/0060446 A1 * | 3/2016 | Park | C08L 25/12 |
| | | | 524/100 |
| 2017/0121519 A1 | 5/2017 | Park et al. | |
| 2018/0037730 A1 | 2/2018 | Lee et al. | |
| 2020/0148872 A1 * | 5/2020 | Schulz | C08L 51/04 |

FOREIGN PATENT DOCUMENTS

| | | |
|---|---|---|
| EP | 3279257 A1 | 2/2018 |
| JP | 2003-529657 A | 10/2003 |
| KR | 10-2004-0105464 A | 8/2005 |
| KR | 10-0530567 A | 11/2005 |
| KR | 10-0781128 B1 | 11/2007 |
| KR | 10-0781963 A | 12/2007 |
| KR | 10-2008-0112842 A | 12/2008 |
| KR | 10-2009-0072651 A | 7/2009 |
| KR | 10-1020054 B1 | 3/2010 |
| KR | 10-1339384 B1 | 6/2011 |
| KR | 10-1240322 B1 | 7/2011 |
| KR | 10-2012-0050138 A | 5/2012 |
| KR | 10-2011-0076686 A | 3/2013 |
| KR | 10-2013-0075793 A | 7/2013 |
| KR | 10-1441315 B1 | 7/2013 |
| KR | 10-2014-0027872 A | 3/2014 |
| KR | 10-2012-0078299 A | 11/2014 |
| KR | 10-2013-0075812 A | 11/2014 |
| KR | 10-2015-0002267 A | 1/2015 |
| WO | 2019/190298 A1 | 10/2019 |

OTHER PUBLICATIONS

Search Report in counterpart European Application No. 19776785.8 dated Dec. 9, 2021, pp. 1-7.
International Search Report in counterpart International Application No. PCT/KR2019/003796 dated Jul. 8, 2019, pp. 1-4.

* cited by examiner

Primary Examiner — Brieann R Johnston
(74) Attorney, Agent, or Firm — Additon, Pendleton & Witherspoon, P.A.

(57) ABSTRACT

Provided are a thermoplastic resin composition and a molded product using same, wherein the thermoplastic resin composition includes a base resin including (A-1) 10 wt % to 30 wt % of a first acrylate-based graft copolymer having an acrylate-based rubbery polymer with an average particle diameter of 300 nm to 400 nm; (A-2) 10 wt % to 35 wt % of a second acrylate-based graft copolymer having an acrylate-based rubbery polymer with an average particle diameter of 100 nm to 200 nm; (B) 10 wt % to 15 wt % of an aromatic vinyl compound-vinyl cyanide compound copolymer; and (C) 35 wt % to 55 wt % of α-methylstyrene-based copolymer, and (D) 1 to 5 parts by weight of an ultrahigh molecular weight styrene-acrylonitrile copolymer having a weight average molecular weight of greater than or equal to 5,000,000 g/mol, based on 100 parts by weight of the base resin.

11 Claims, 2 Drawing Sheets

[Figure 1]
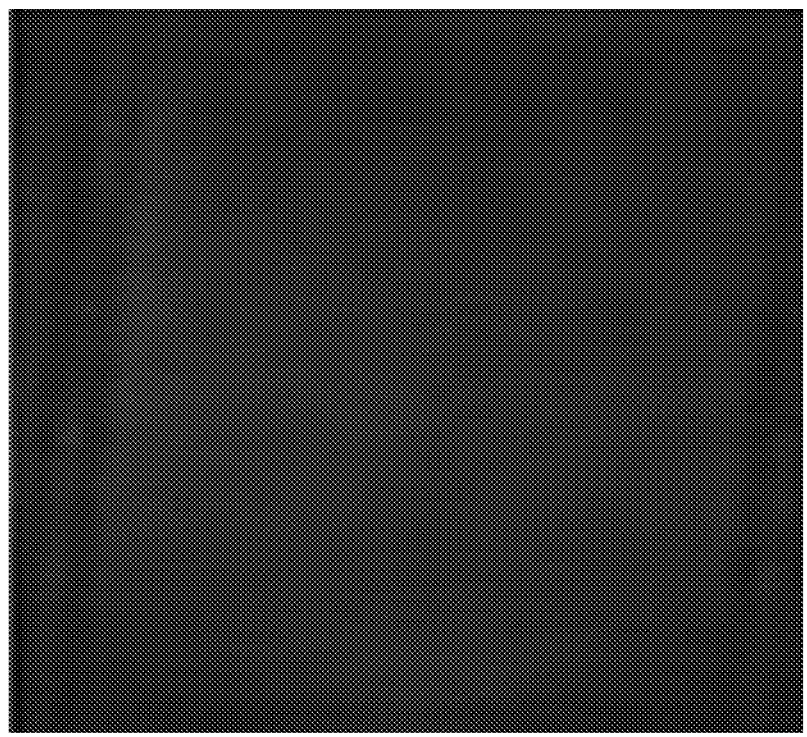

[Figure 2]
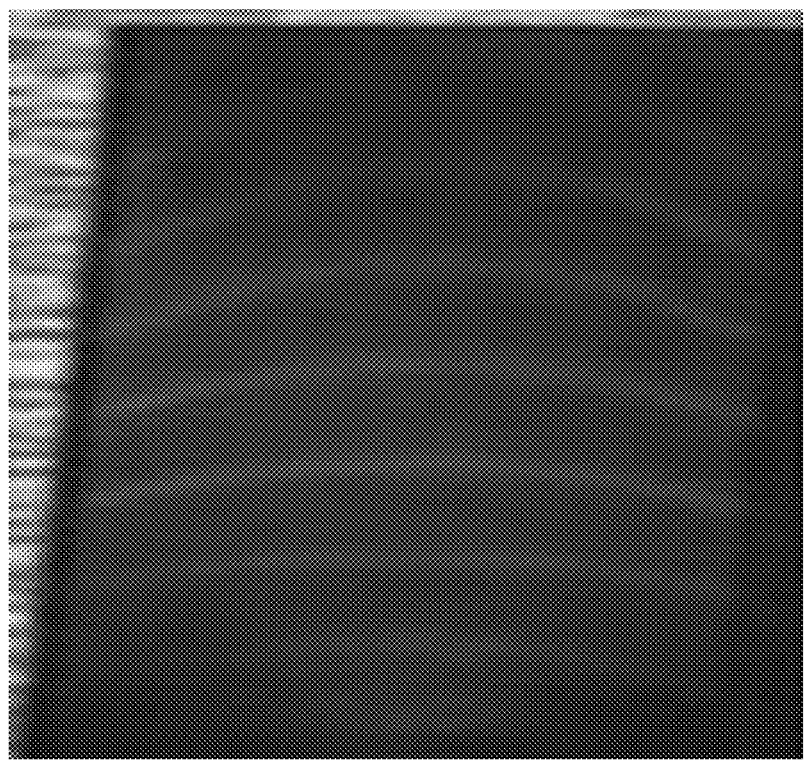

THERMOPLASTIC RESIN COMPOSITION AND MOLDED PRODUCT USING SAME

CROSS-REFERENCE TO RELATED APPLICATIONS

This application claims priority to and the benefit of International Application No. PCT/KR2019/003796, filed Apr. 1, 2019, which published as WO 2019/190298 on Oct. 3, 2019; Korean Patent Application No. 10-2018-0037694, filed in the Korean Intellectual Property Office on Mar. 30, 2018; and Korean Patent Application No. 10-2019-0036963, filed in the Korean Intellectual Property Office on Mar. 29, 2019, the entire disclosure of each of which is incorporated herein by reference.

TECHNICAL FIELD

The present invention relates to a thermoplastic resin composition and a molded product using the same.

BACKGROUND ART

Recently, thermoplastic resins, which have been widely applied to electric and electronic, automobile, building materials, and leisure products, are rapidly replacing existing glass or metal fields. Accordingly, there is an increasing demand for a thermoplastic resin capable of realizing improved impact resistance, weather resistance, molding processability, and high quality appearance.

In general, when an acrylonitrile-butadiene-styrene resin (hereinafter referred to as ABS resin) is used as a thermoplastic resin, there is a problem that an unsaturated double bond of the butadiene-based rubbery polymer is stimulated and decomposed by UV. This problem causes discoloration or cracking of the product made of ABS resin. On the other hand, an acrylonitrile-styrene-acrylate resin (hereinafter referred to as ASA resin) that use an acrylate-based rubbery polymer instead of a butadiene-based rubbery polymer may is known as an alternative to solve the problem of decomposition due to UV because the acrylate-based rubbery polymer does not have unsaturated double bonds. In addition, an ASA resin has a lower specific gravity than glass or metal, and has excellent advantages such as moldability, chemical resistance, and thermal stability.

According to the recent environmental trend, there is an increasing demand for uncoated resin that does not undergo a painting process. Since the surface of the molded product using the uncoated resin is not covered by painting, it is necessary to implement improved appearance characteristics of the uncoated resin itself.

In order to improve the appearance characteristics of the uncoated resin, it is necessary to suppress a generation of flow marks on the surface of the molded product using the uncoated resin. For this purpose, attempts have been made to use a small particle-diameter impact-reinforcing agent or to improve fluidity of the resin, but the impact resistance of the resin may be significantly reduced.

Therefore, it is necessary to develop a thermoplastic resin composition capable of realizing improved appearance characteristics while maintaining improved impact resistance and fluidity.

DISCLOSURE

Technical Problem

An embodiment provides a thermoplastic resin composition capable of realizing improved appearance characteristics while maintaining improved impact resistance and fluidity.

Another embodiment provides a molded product using the thermoplastic resin composition.

Technical Solution

According to an embodiment, a thermoplastic resin composition includes a base resin including (A-1) 10 wt % to 30 wt % of a first acrylate-based graft copolymer having an acrylate-based rubbery polymer with an average particle diameter of 300 nm to 400 nm; (A-2) 10 wt % to 35 wt % of a second acrylate-based graft copolymer having an acrylate-based rubbery polymer with an average particle diameter of 100 nm to 200 nm; (B) 10 wt % to 15 wt % of an aromatic vinyl compound-vinyl cyanide compound copolymer; and (C) 35 wt % to 55 wt % of α-methylstyrene-based copolymer, and (D) 1 to 5 parts by weight of an ultrahigh molecular weight styrene-acrylonitrile copolymer having a weight average molecular weight of greater than or equal to 5,000,000 g/mol, based on 100 parts by weight of the base resin.

At least one of the first acrylate-based graft copolymer (A-1) and the second acrylate-based graft copolymer (A-2) may be a graft copolymer of 40 wt % to 60 wt % of a mixture of an aromatic vinyl compound and a vinyl cyanide compound onto 40 wt % to 60 wt % of the acrylate-based rubbery polymer.

At least one of the first acrylate-based graft copolymer (A-1) and the second acrylate-based graft copolymer (A-2) may be an acrylonitrile-styrene-acrylate graft copolymer.

The aromatic vinyl compound-vinyl cyanide compound copolymer (B) may be a copolymer of a monomer mixture including 60 wt % to 80 wt % of an aromatic vinyl compound and 20 wt % to 40 wt % of a vinyl cyanide compound.

The aromatic vinyl compound-vinyl cyanide compound copolymer (B) may have a weight average molecular weight of 80,000 g/mol to 200,000 g/mol.

In the aromatic vinyl compound-vinyl cyanide compound copolymer (B), the aromatic vinyl compound may include styrene unsubstituted or substituted with a halogen or a C1 to C10 alkyl group (but not including α-methylstyrene), or a combination thereof.

In the aromatic vinyl compound-vinyl cyanide compound copolymer (B), the vinyl cyanide compound may include acrylonitrile, methacrylonitrile, fumaronitrile, or a combination thereof.

The α-methylstyrene-based copolymer (C) may be a copolymer of a monomer mixture including 50 wt % to 80 wt % of α-methylstyrene, 10 wt % to 50 wt % of a vinyl cyanide compound, and 0 wt % to 40 wt % of an aromatic vinyl compound.

In the α-methylstyrene-based copolymer (C), the aromatic vinyl compound may include styrene unsubstituted or substituted with a halogen or a C1 to C10 alkyl group (but not including α-methylstyrene), or a combination thereof and the vinyl cyanide compound may include acrylonitrile, methacrylonitrile, fumaronitrile, or a combination thereof.

The thermoplastic resin composition may further include at least one additive selected from an ultraviolet (UV) stabilizer, a fluorescent whitening agent, a releasing agent, a nucleating agent, an inorganic material, a lubricant, an antistatic agent, a heat stabilizer, an impact-reinforcing agent, a pigment, and a dye.

Meanwhile, according to another embodiment, a molded product using the aforementioned thermoplastic resin composition is provided.

Advantageous Effects

The thermoplastic resin composition may be capable of realizing improved appearance characteristics while maintaining improved impact resistance and fluidity.

DESCRIPTION OF THE DRAWINGS

FIG. 1 is an image showing the appearance of a specimen according to Example 1, and FIG. 2 is an image showing the appearance of a specimen according to Comparative Example 1.

MODE FOR INVENTION

Hereinafter, embodiments of the present invention are described in detail. However, these embodiments are exemplary, the present invention is not limited thereto and the present invention is defined by the scope of claims.

In the present invention, unless otherwise described, the average particle diameter means a Z-average particle diameter measured using a dynamic light scattering analyzer.

An embodiment provides a thermoplastic resin composition capable of realizing improved appearance characteristics while maintaining improved impact resistance and fluidity.

The thermoplastic resin composition may include a base resin including (A-1) 10 wt % to 30 wt % of a first acrylate-based graft copolymer having an acrylate-based rubbery polymer with an average particle diameter of 300 nm to 400 nm, (A-2) 10 wt % to 35 wt % of a second acrylate-based graft copolymer having an acrylate-based rubbery polymer with an average particle diameter of 100 nm to 200 nm, (B) 10 wt % to 15 wt % of an aromatic vinyl compound-vinyl cyanide compound copolymer, and (C) 35 wt % to 55 wt % of α-methylstyrene-based copolymer, and (D) 1 to 5 parts by weight of an ultrahigh molecular weight styrene-acrylonitrile copolymer having a weight average molecular weight of greater than or equal to 5,000,000 g/mol, based on 100 parts by weight of the base resin.

Hereinafter, each component included in the thermoplastic resin composition is described in detail.

(A-1) and (A-2) First and Second Acrylate-Based Graft Copolymers

The thermoplastic resin composition according to an embodiment includes a first acrylate-based graft copolymer (A-1) and a second acrylate-based graft copolymer (A-2) having different average particle diameters. When the acrylate-based graft copolymers having different average particle diameters are used together, the thermoplastic resin composition including the same may realize improved appearance characteristics while maintaining improved impact resistance and fluidity.

In an embodiment, at least one of the first acrylate-based graft copolymer (A-1) and the second acrylate-based graft copolymer (A-2) may be a graft copolymer of 40 wt % to 60 wt % of a monomer mixture of an aromatic vinyl compound and a vinyl cyanide compound onto 40 wt % to 60 wt % of the acrylate-based rubbery polymer.

In an embodiment, each of the first acrylate-based graft copolymer (A-1) and the second acrylate-based graft copolymer (A-2) is prepared by graft polymerization of a monomer mixture including an aromatic vinyl compound and a vinyl cyanide compound onto the aforementioned acrylate-based rubbery polymer.

The polymerization method may be a conventional production method, for example, emulsion polymerization, suspension polymerization, solution polymerization, and bulk polymerization. The first acrylate-based graft copolymer (A-1) and the second acrylate-based graft copolymer (A-2) may be formed using the same polymerization method, or may be formed using different polymerization methods.

The acrylate-based rubbery polymer may be an alkyl acrylate-based rubber, for example, C2 to C10 alkyl acrylate-containing rubber. The C2 to C10 alkyl acrylate may be, for example, butyl acrylate, ethyl hexyl acrylate, or a mixture thereof, but is not limited thereto.

The acrylate-based rubbery polymer may be included in an amount of 40 wt % to 60 wt % based on 100 wt % of the first acrylate-based graft copolymer (A-1) or the second acrylate-based graft copolymer (A-2).

The monomer mixture of the aromatic vinyl compound and the vinyl cyanide compound grafted onto the acrylate-based rubbery polymer may be composed of 60 wt % to 80 wt % of the aromatic vinyl compound and 20 wt % to 40 wt % of the vinyl cyanide compound.

In addition, a component derived from the aromatic vinyl compound and a component derived from the vinyl cyanide compound may be included in an amount of 40 wt % to 60 wt % based on 100 wt % of the first acrylate-based graft copolymer (A-1) or the second acrylate-based graft copolymer (A-2).

The aromatic vinyl compound may include styrene, α-methylstyrene, p-methylstyrene, p-t-butylstyrene, 2,4-dimethylstyrene, chlorostyrene, vinyltoluene, vinylnaphthalene, and the like, which may be used alone or in a mixture. Among these, styrene may be preferably used.

Examples of the vinyl cyanide compound may include acrylonitrile, methacrylonitrile, and fumaronitrile, which may be used alone or in a mixture. Among them, acrylonitrile may be preferably used.

At least one of the first acrylate-based graft copolymer (A-1) and the second acrylate-based graft copolymer (A-2) may be an acrylonitrile-styrene-acrylate graft copolymer (g-ASA). In an embodiment, each of the first acrylate-based graft copolymer (A-1) and the second acrylate-based graft copolymer (A-2) may be an acrylonitrile-styrene-acrylate graft copolymer (g-ASA).

The acrylonitrile-styrene-acrylate graft copolymer (g-ASA) may be prepared through a graft polymerization reaction onto an alkyl acrylate-based rubber by adding acrylonitrile and styrene to the alkyl acrylate-based rubber.

In an embodiment, the first acrylate-based graft copolymer (A-1) may be an acrylonitrile-styrene-acrylate graft copolymer (g-ASA) in which the acrylate-based rubbery polymer has an average particle diameter of greater than or equal to 250 nm, greater than or equal to 300 nm, less than or equal to 400 nm, less than or equal to 350 nm, 300 nm to 400 nm, or 300 nm to 350 nm.

In an embodiment, the first acrylate-based graft copolymer (A-1) may be included in an amount of greater than or equal to 10 wt %, greater than or equal to 12 wt %, less than or equal to 30 wt %, less than or equal to 25 wt %, less than or equal to 20 wt %, less than or equal to 15 wt %, 10 wt % to 30 wt %, or 10 wt % to 20 wt %, based on 100 wt % of the base resin.

When the amount of the first acrylate-based graft copolymer (A-1) in the base resin is less than 10 wt %, the impact resistance of the thermoplastic resin composition may be deteriorated, and when it exceeds 30 wt %, the fluidity and coloring properties of the thermoplastic resin composition may be deteriorated.

In an embodiment, the second acrylate-based graft copolymer (A-2) may be an acrylonitrile-styrene-acrylate graft copolymer (g-ASA) in which the acrylate-based rubbery polymer has an average particle diameter of greater than or equal to 100 nm, greater than or equal to 120 nm, greater than or equal to 140 nm, less than or equal to 200 nm, less than or equal to 180 nm, less than or equal to 160 nm, 100 nm to 200 nm, or 120 nm to 180 nm.

In an embodiment, the second acrylate-based graft copolymer (A-2) may be included in an amount of greater than or equal to 10 wt %, greater than or equal to 15 wt %, greater than or equal to 20 wt %, greater than or equal to 25 wt %, less than or equal to 35 wt %, less than or equal to 33 wt %, 10 wt % to 35 wt %, or 25 wt % to 35 wt % based on 100 wt % of the base resin.

When the amount of the second acrylate-based graft copolymer (A-2) in the base resin is less than 10 wt %, coloring properties of the thermoplastic resin composition may be deteriorated, and when it exceeds 35 wt %, fluidity of the thermoplastic resin composition may be deteriorated.

(B) Aromatic Vinyl Compound-Vinyl Cyanide Compound Copolymer

In an embodiment, the aromatic vinyl compound-vinyl cyanide compound copolymer (B) may be a copolymer of an aromatic vinyl compound and a vinyl cyanide compound. The aromatic vinyl compound-vinyl cyanide compound copolymer may have a weight average molecular weight of greater than or equal to 80,000 g/mol, greater than or equal to 85,000 g/mol, greater than or equal to 90,000 g/mol, less than or equal to 200,000 g/mol, greater than or equal to 150,000 g/mol, 80,000 g/mol to 200,000 g/mol, or 80,000 g/mol to 150,000 g/mol.

In the present invention, the weight average molecular weight is measured using a gel permeation chromatography (GPC; Agilent Technologies 1200 series) after dissolving a particulate sample in tetrahydrofuran (THF) (column is Shodex LF-804 and the standard sample made of Shodex polystyrene is used). The aromatic vinyl compound may include styrene unsubstituted or substituted with halogen or a C1 to C10 alkyl group (but not including α-methylstyrene), or a combination thereof. Specific examples of the aromatic vinyl compound may include any one or more selected from styrene, C1 to C10 alkyl-substituted styrene (but not including α-methylstyrene), halogen-substituted styrene, vinyltoluene, vinylnaphthalene, and a mixture thereof. Specific examples of the alkyl-substituted styrene may include p-methylstyrene, o-ethylstyrene, m-ethylstyrene, p-ethylstyrene, p-t-butylstyrene, and 2,4-dimethylstyrene.

The vinyl cyanide compound may include acrylonitrile, methacrylonitrile, fumaronitrile, or a mixture thereof.

In one embodiment, the aromatic vinyl compound-vinyl cyanide compound copolymer (B) may be a styrene-acrylonitrile copolymer (SAN) having a weight average molecular weight of 80,000 g/mol to 200,000 g/mol.

In an embodiment, the aromatic vinyl compound-vinyl cyanide compound copolymer (B) may be included in an amount of greater than or equal to 10 wt %, greater than or equal to 12 wt %, less than or equal to 15 wt %, 10 wt % to 15 wt %, or 12 wt % to 15 wt % based on 100 wt % of the base resin.

When the amount of the aromatic vinyl compound-vinyl cyanide compound copolymer (B) is less than 10 wt %, coloring properties and heat resistance of the thermoplastic resin composition may be deteriorated, and when it exceeds 15 wt %, the impact resistance of the thermoplastic resin composition may be deteriorated.

(C) Alpha-Methylstyrene (α-Methylstyrene)-Based Copolymer

In an embodiment, the α-methyl styrene-based copolymer (C) functions to improve heat resistance and impact resistance of the thermoplastic resin composition.

In an embodiment, the α-methyl styrene-based copolymer may be a copolymer of a monomer mixture including 50 wt % to 80 wt % of α-methylstyrene. In an embodiment, the α-methylstyrene-based copolymer (C) may be a copolymer of a monomer mixture including 50 wt % to 80 wt % of α-methylstyrene, 10 wt % to 50 wt % of a vinyl cyanide compound, and 0 wt % to 40 wt % of an aromatic vinyl compound.

In the α-methylstyrene-based copolymer (C), the aromatic vinyl compound may include styrene unsubstituted or substituted with a halogen or a C1 to C10 alkyl group (but not including α-methylstyrene), or a combination thereof and the vinyl cyanide compound may include acrylonitrile, methacrylonitrile, fumaronitrile, or a combination thereof.

In an embodiment, the α-methylstyrene-based copolymer (C) may be a copolymer of a monomer mixture of 50 wt % to 80 wt % of α-methylstyrene, 10 wt % to 50 wt % of acrylonitrile, and 0 wt % to 40 wt % of styrene.

In one embodiment, the α-methylstyrene-based copolymer (C) may be prepared using a conventional manufacturing method, for example, emulsion polymerization, suspension polymerization, solution polymerization, and bulk polymerization.

In an embodiment, the α-methylstyrene-based copolymer (C) may be included in an amount of greater than or equal to 35 wt %, greater than or equal to 40 wt %, less than or equal to 55 wt %, less than or equal to 50 wt %, 35 wt % to 55 wt %, or 40 wt % to 50 wt % based on 100 wt % of the base resin.

When the amount of the α-methylstyrene-based copolymer (C) is less than 35 wt %, the heat resistance of the thermoplastic resin composition may be lowered, and when it exceeds 55 wt %, the impact resistance and appearance characteristics of the thermoplastic resin composition may be lowered.

(D) Ultrahigh Molecular Weight Styrene-Acrylonitrile Copolymer

In an embodiment, the ultrahigh molecular weight styrene-acrylonitrile copolymer (D) functions to improve appearance characteristics of the thermoplastic resin composition.

The ultrahigh molecular weight styrene-acrylonitrile copolymer (D) according to an embodiment refers to a styrene-acrylonitrile copolymer having a weight average molecular weight of greater than or equal to at least 5,000,000 g/mol, 5,000,000 g/mol to 10,000,000 g/mol, 5,000,000 g/mol to 9,000,000 g/mol, 5,000,000 g/mol to 8,000,000 g/mol, or 6,000,000 g/mol to 8,000,000 g/mol.

Therefore, the ultrahigh molecular weight styrene-acrylonitrile copolymer according to an embodiment may be, for example, included in an amount of 0 to 10 parts by weight, 0 to 5 parts by weight, or 1 to 5 parts by weight, based on 100 parts by weight of the base resin.

If the ultrahigh molecular weight styrene-acrylonitrile copolymer (D) is not included or is included in too small amount, appearance characteristics of the thermoplastic resin composition may not be improved, and if the amount is too high at a level exceeding 10 parts by weight, moldability and processability of the thermoplastic resin composition may be deteriorated.

(E) Additive

The thermoplastic resin composition according to the embodiment may further include at least one additive selected from an ultraviolet (UV) stabilizer, a fluorescent whitening agent, a releasing agent, a nucleating agent, an inorganic material, a lubricant, an antistatic agent, a heat stabilizer, an impact-reinforcing agent, a pigment, and a dye, as necessary, within a range not departing from the object of the present invention.

Meanwhile, the thermoplastic resin composition according to an embodiment may be mixed with other resins or other rubber components and used together.

Hereinafter, preferred embodiments of the present invention are described. These examples, however, are not in any sense to be interpreted as limiting the scope of the invention.

Examples 1 to 3 and Comparative Examples 1 to 5

0.8 parts by weight of metal stearate, 0.02 parts by weight of silicone oil, 1.2 parts by weight of a hindered amine-based ultraviolet (UV) stabilizer, and 2.5 parts by weight of carbon black were commonly added as other additives to the components shown in Table 1 and then, mixed in a conventional mixer and extruded with a twin-screw extruder having L/D=29 and φ=45 mm at 220° C. to manufacture pellets.

The pellets were dried in a dehumidifying drier set at 80° C. for 2 hours and injection-molded by using a 6 oz injection molding machine at a cylinder temperature of 250° C. and a molding temperature of 60° C. to manufacture specimens for measuring properties and appearance, and the measured properties are shown in Table 2.

% of acrylonitrile and having a weight average molecular weight of 124,000 g/mol was used. (Manufacturer: Lotte Advanced Materials Co., Ltd.)

(B), Type-II: A styrene-acrylonitrile copolymer (SAN) obtained by copolymerizing 71.5 wt % of styrene and 28.5 wt % of acrylonitrile and having a weight average molecular weight of 97,000 g/mol was used. (Manufacturer: Lotte Advanced Materials Co., Ltd.)

(C): An α-methylstyrene-styrene-acrylonitrile copolymer obtained by copolymerizing 54 wt % of α-methylstyrene, 19 wt % of styrene, and 27 wt % of acrylonitrile was used. (Manufacturer: Lotte Advanced Materials Co., Ltd.)

(D): An ultrahigh molecular weight styrene-acrylonitrile copolymer having a weight average molecular weight of greater than or equal to 5,000,000 g/mol was used. (Manufacturer: Zibo Huaxing Additives)

Evaluation

The specimens according to Examples 1 to 3 and Comparative Examples 1 to 5 were measured with respect to impact resistance, fluidity, coloring properties, and appearance characteristics in the following method, and the results are shown in Table 2.

1. Impact Resistance (unit: kgf·cm/cm)

Izod impact strength of 3.2 mm-thick notched specimens was measured according to ASTM D256.

2. Fluidity (unit: g/10 min)

A melt flow index (MI) was measured at 220° C. under a 10 kg load according to ASTM D1238.

3. Coloring Properties

Lightness (L) of the specimens was measured by using a color difference meter CM-3700d, Konica Minolta, Inc. The

TABLE 1

| Components | | unit | Examples | | | Comparative Examples | | | | |
|---|---|---|---|---|---|---|---|---|---|---|
| | | | 1 | 2 | 3 | 1 | 2 | 3 | 4 | 5 |
| Base resin | (A-1) | wt % | 13 | 13 | 13 | 13 | 13 | 13 | — | 44 |
| | (A-2) Type-I | wt % | 31 | 31 | — | — | 31 | 31 | 44 | — |
| | Type-II | wt % | — | — | 31 | 31 | — | — | — | — |
| | (B) Type-I | wt % | 13 | 13 | 13 | 13 | 13 | 13 | 13 | 13 |
| | Type-II | wt % | — | — | — | 43 | — | 43 | — | — |
| | (C) | wt % | 43 | 43 | 43 | — | 43 | — | 43 | 43 |
| | (D) | parts by weight | 1.5 | 3 | 1.5 | — | — | 1.5 | 1.5 | 1.5 |

Part by weight: part by weight based on 100 parts by weight of base resin ((A-1)+(A-2)+(B)+(C))

(A-1): An acrylonitrile-styrene-acrylate graft copolymer (g-ASA) that a styrene-acrylonitrile copolymer was grafted onto a rubbery polymer including butyl acrylate and having an average particle diameter of about 320 nm was used. (Manufacturer: Lotte Advanced Materials Co., Ltd.)

(A-2), Type-I: An acrylonitrile-styrene-acrylate graft copolymer (g-ASA) that a styrene-acrylonitrile copolymer was grafted onto a rubbery polymer including butyl acrylate and having an average particle diameter of about 150 nm was used. (Manufacturer: Lotte Advanced Materials Co., Ltd.)

(A-2), Type-II: An acrylonitrile-styrene-acrylate graft copolymer (g-ASA) that a styrene-acrylonitrile copolymer was grafted onto a rubbery polymer including butyl acrylate and having an average particle diameter of about 180 nm was used. (Manufacturer: Lotte Advanced Materials Co., Ltd.)

(B), Type-I: A styrene-acrylonitrile copolymer (SAN) obtained by copolymerizing 71 wt % of styrene and 29 wt lightness was evaluated by using the number of 0 to 100, wherein as the number is closer to 0, it denotes black, and as the number is closer to 100, it denotes white. As the lightness was lower, the specimens looked stronger black and thus had excellent coloring properties about a pigment and the like.

4. Appearance Characteristics

A mold having a pinpoint gate structure was used to injection-mold the specimens having a size of 50 mm×200 mm×2 mm according to Examples 1 to 3 and Comparative Examples 1 to 5 at a high speed, and then, each specimen was examined with naked eyes to check whether or not flow marks were generated or not and then, evaluated into ○ (generated, clearly appear), Δ (generated, rather blurry), and × (not generated).

On the other hand, appearance images of the specimens according to Example 1 and Comparative Example 1 are respectively shown in FIGS. 1 and 2.

TABLE 2

| Evaluation | Examples | | | Comparative Examples | | | | |
|---|---|---|---|---|---|---|---|---|
| | 1 | 2 | 3 | 1 | 2 | 3 | 4 | 5 |
| Izod Impact strength (kgf · cm/cm) | 27.0 | 28.5 | 29.4 | 19.2 | 25.8 | 17.5 | 14.3 | 38.1 |
| Melt flow index (g/10 min) | 11.2 | 9.0 | 7.4 | 9.5 | 14.2 | 18.8 | 14.5 | 6.4 |
| lightness | 8.8 | 8.7 | 9.0 | 10.9 | 9.0 | 8.6 | 7.9 | 11.5 |
| Occurrence degree of flow mark | X | X | X | ○ | Δ | X | X | ○ |

Referring to Table 2, the specimens formed of the thermoplastic resin compositions according to Examples 1 to 3 exhibited excellent impact resistance, fluidity, and coloring properties.

In addition, referring to Table 2 and FIGS. 1 to 2, the appearance of the specimen formed of the thermoplastic resin composition according to Example 1 did not have a flow mark at all (FIG. 1), but the appearance of the specimen formed of the thermoplastic resin composition according to Comparative Example 1 had a flow mark (FIG. 2).

Accordingly, referring to the results of Table 2 and FIGS. 1 to 2, the thermoplastic resin composition according to one embodiment exhibited excellent impact resistance and fluidity and simultaneously, realized excellent appearance characteristics.

As described above, the present invention has been described through preferred embodiments, but a person having an ordinary skill would understand easily that the present invention is not limited thereto, and various modifications and variations may be possible without departing from the concept and scope of the following claims.

The invention claimed is:

1. A thermoplastic resin composition, comprising
a base resin comprising
(A-1) 10 wt % to 30 wt % of a first acrylate-based graft copolymer having an acrylate-based rubbery polymer with an average particle diameter of 300 nm to 400 nm;
(A-2) 25 wt % to 35 wt % of a second acrylate-based graft copolymer having an acrylate-based rubbery polymer with an average particle diameter of 100 nm to 200 nm;
(B) 10 wt % to 15 wt % of an aromatic vinyl compound-vinyl cyanide compound copolymer; and
(C) 40 wt % to 50 wt % of α-methylstyrene-based copolymer, and
(D) 1 to 5 parts by weight of an ultrahigh molecular weight styrene-acrylonitrile copolymer having a weight average molecular weight of greater than or equal to 5,000,000 g/mol, based on 100 parts by weight of the base resin.

2. The thermoplastic resin composition of claim 1, wherein the first acrylate-based graft copolymer (A-1) and/or the second acrylate-based graft copolymer (A-2) is a graft copolymer of 40 wt % to 60 wt % of a mixture of an aromatic vinyl compound and a vinyl cyanide compound onto 40 wt % to 60 wt % of the acrylate-based rubbery polymer.

3. The thermoplastic resin composition of claim 1, wherein the first acrylate-based graft copolymer (A-1) and/or the second acrylate-based graft copolymer (A-2) is an acrylonitrile-styrene-acrylate graft copolymer.

4. The thermoplastic resin composition of claim 1, wherein the aromatic vinyl compound-vinyl cyanide compound copolymer (B) is a copolymer of a monomer mixture including 60 wt % to 80 wt % of an aromatic vinyl compound and 20 wt % to 40 wt % of a vinyl cyanide compound.

5. The thermoplastic resin composition of claim 1, wherein the aromatic vinyl compound-vinyl cyanide compound copolymer (B) has a weight average molecular weight of 80,000 g/mol to 200,000 g/mol.

6. The thermoplastic resin composition of claim 1, wherein in the aromatic vinyl compound-vinyl cyanide compound copolymer (B), the aromatic vinyl compound comprises styrene unsubstituted or substituted with a halogen or a C1 to C10 alkyl group not including α-methylstyrene, or a combination thereof.

7. The thermoplastic resin composition of claim 1, wherein in the aromatic vinyl compound-vinyl cyanide compound copolymer (B), the vinyl cyanide compound comprises acrylonitrile, methacrylonitrile, fumaronitrile, or a combination thereof.

8. The thermoplastic resin composition of claim 1, wherein the α-methylstyrene-based copolymer (C) is a copolymer of a monomer mixture including 50 wt % to 80 wt % of α-methylstyrene, 10 wt % to 50 wt % of a vinyl cyanide compound, and 0 wt % to 40 wt % of an aromatic vinyl compound.

9. The thermoplastic resin composition of claim 8, wherein in the α-methylstyrene-based copolymer (C), the aromatic vinyl compound comprises styrene unsubstituted or substituted with a halogen or a C1 to C10 alkyl group not including α-methylstyrene, or a combination thereof and the vinyl cyanide compound comprises acrylonitrile, methacrylonitrile, fumaronitrile, or a combination thereof.

10. The thermoplastic resin composition of claim 1, which further comprises an additive selected from an ultraviolet (UV) stabilizer, a fluorescent whitening agent, a releasing agent, a nucleating agent, an inorganic material, a lubricant, an antistatic agent, a heat stabilizer, an impact-reinforcing agent, a pigment, and/or a dye.

11. A molded product using the thermoplastic resin composition of claim 1.

* * * * *